United States Patent [19]

Mast et al.

[11] Patent Number: 5,586,784
[45] Date of Patent: Dec. 24, 1996

[54] ROLLOVER PROTECTIVE STRUCTURE AND METHOD

[75] Inventors: Donald R. Mast, Argenta; Robert L. McNabb, Monticello; Joseph A. Rapp, Morris, all of Ill.

[73] Assignee: Caterpillar Inc., Peoria, Ill.

[21] Appl. No.: 613,300

[22] Filed: Mar. 11, 1996

Related U.S. Application Data

[63] Continuation of Ser. No. 439,048, May 11, 1995, Pat. No. 5,529,342.

[51] Int. Cl.⁶ ................................................ B60R 21/13
[52] U.S. Cl. ............................................ 280/756; 296/102
[58] Field of Search .......................... 280/756; 296/102, 296/190, 204

[56] References Cited

U.S. PATENT DOCUMENTS

| | | | |
|---|---|---|---|
| 3,791,668 | 2/1974 | Adams | 280/150 |
| 4,032,187 | 6/1977 | Atherton | 296/102 |
| 4,159,835 | 7/1979 | Leja et al. | 280/756 |
| 4,382,613 | 5/1983 | Haupt | 280/756 |
| 4,848,835 | 7/1989 | DeRees | 296/204 |
| 4,940,280 | 7/1990 | Templeton | 296/190 |
| 5,129,676 | 7/1992 | Sheehan | 280/756 |
| 5,280,955 | 1/1994 | Nelson et al. | 280/756 |
| 5,326,148 | 7/1994 | Kojima et al. | 296/190 |

FOREIGN PATENT DOCUMENTS

2317136  3/1977  France .

*Primary Examiner*—Kenneth R. Rice
*Attorney, Agent, or Firm*—Dennis C. Skarvan

[57] ABSTRACT

A rollover protective structure (ROPS) for use with construction machinery includes a two-post frame having upright posts attached between a base and canopy and cross members attached between the posts. The posts are constructed from a pair of angled post members to define a box-like cross-section for the posts. The posts have rounded interior corners and square interior corners between adjacent sides thereof. Reinforcing members are attached between the adjacent sides and across the rounded interior corners to uniformly stiffen the post. Additionally, reinforcing members are attached between the base and upright posts to reinforce the intersection thereof. The reinforcing members include an upper portion attached between the post and base and a lower portion attached between the upper portion and base. The upper portion and the lower portion are constructed to collapse sequentially to maintain resistance to additional load deformation as the rollover protective structure is deformed.

10 Claims, 7 Drawing Sheets

Fig_1_

Fig_2_

Fig_3_

Fig_8_

Fig_9_

5,586,784

ROLLOVER PROTECTIVE STRUCTURE AND METHOD

This is a continuation application of application Ser. No. 08/439,048, filed May 11, 1995 now U.S. Pat. No. 5,529,342.

TECHNICAL FIELD

The present invention relates generally to rollover protective structures for use with construction machinery and, more particularly, to the reinforcement of two-post rollover protective structures.

BACKGROUND ART

Rollover protective structures (ROPS) are useful to protect the operator of construction equipment from injury in the event of operator error such as the operator rolling the equipment. Such structures are typically fabricated of various support members attached together to form a frame surrounding the operator. The frame can be generally box-like by virtue of having four posts supporting a canopy (four-post ROPS), or can simply include two posts supporting a canopy (two-post ROPS). Regardless of the type of ROPS, the structure is desirably capable of deforming in a controlled manner under adverse loading conditions in order to protect the operator.

Whether due to geometric notches resulting from a change in cross-section across a load-path or metallurgical notches resulting from a change in material properties across a load-path, the ROPS are potentially subject to concentrated deformation at the notch location. Should the deformation at the notch location be too large, the ROPS may become unstable during deformation and ultimately collapse. Therefore, a ROPS design is desired which controls deformation at both geometric and metallurgical notches so that the ROPS deforms under adverse loading in a controlled manner.

DISCLOSURE OF THE INVENTION

According to one embodiment of the present invention, a rollover protective structure for use with construction machinery is disclosed, comprising a base member, a first post attached to and extending upwardly from the base member, a second post attached to and extending upwardly from said base member, a cross member extending between said first post and said second post above said base member, a first reinforcing member attached between said base member and said first post adjacent to the intersection thereof, and a second reinforcing member attached between said base member and said second post adjacent to the intersection thereof, said first reinforcing member and said second reinforcing member being constructed to collapse sequentially to maintain resistance to additional load deformation as the rollover protective structure is deformed.

According to another embodiment of the present invention, a rollover protective structure for use with construction machinery is disclosed, comprising a frame including an upright post attached to a base member, and a first reinforcing member attached between said base member and said upright post adjacent to the intersection thereof, said first reinforcing member including an upper portion attached between said upright post and said base member and a lower portion attached between said upper portion and said base member, said upper portion and said lower portion being constructed to collapse sequentially to maintain resistance to additional load deformation as the rollover protective structure is deformed.

According to another embodiment of the present invention, a method for reinforcing a rollover protective structure of a construction machine is disclosed, the structure including a frame having a first support member attached to a second support member, the method comprising the step of attaching a reinforcing member at the intersection of said first support member and said second support member, said reinforcing member being constructed to collapse sequentially to maintain resistance to additional load deformation as the rollover protective structure is deformed.

According to another embodiment of the present invention, a method for extending the collapse cushion of a rollover protective structure of a construction machine is disclosed, the structure including a frame having a first support member attached to a second support member and a reinforcing member attached between said first support member and said second support member adjacent to the intersection thereof, the method comprising the step of plastically deforming a first portion of said reinforcing member under a first load, said first portion collapsing such that a second portion of said reinforcing member is plastically deformed and collapses under a second load greater than said first load.

BEST MODE FOR CARRYING OUT THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
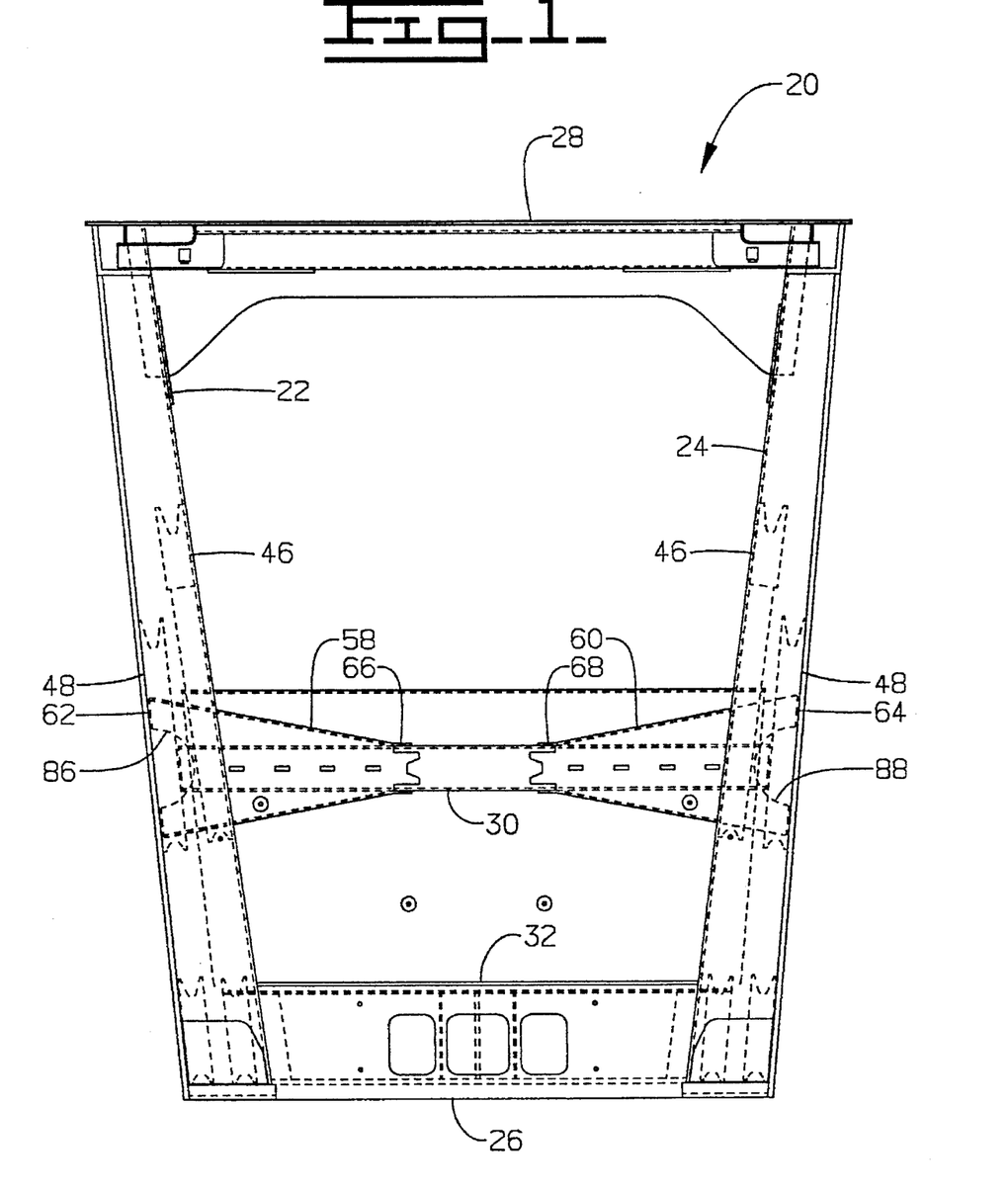
FIG. 1 is a front elevational view of a two-post ROPS according to one embodiment of the present invention.

Referring now to FIG. 1, a two-post ROPS 20 is disclosed consisting only of posts 22 and 24 as the main upright supports. Posts 22 and 24 are attached to and extend between a mounting plate 26 and a canopy 28. Cross members 30 and 32 are attached to and extend between posts 22 and 24 at elevational locations between mounting plate 26 and canopy 28. In the preferred embodiment shown, the various support members of ROPS 20 are welded together to define a ROPS frame. However, other attachments known in the art are also contemplated for the ROPS frame while still keeping within the present invention. The particular attachment is a function of the loads for which the frame is designed to withstand. Further, in the specific preferred embodiment, the various welds are full penetration welds; however, other welds and associated heat treatments known in the art are also contemplated while still keeping within the present invention.

In the preferred embodiment, posts 22 and 24 and cross members 30 and 32 are box-like in cross-section to provide added strength with a minimum of material. ROPS 20 provides stable deformation by minimizing deformation at known notch points and by controlling any resulting deformation away from the notch points so as to maintain resistance to additional load deformation as the structure is deformed.

ROPS 20 first minimizes deformation at known notch points by reinforcing the structure adjacent to the notch points, thereby involving a greater amount of the overall structure in resisting load deformation. For example, the weld locations between the various components are known metallurgical notch points. Other known notch points are geometric notch points along the load paths of the ROPS. In ROPS 20, the geometric notch points include the attachment of posts 22 and 24 to base plate 26, the attachment of cross member 30 between posts 22 and 24, and the attachment of posts 22 and 24 to canopy 28. Because ROPS 20 has only two upright posts, each of the above notch points must be capable of withstanding significant bending and torsional strains. Accordingly, the present invention provides selective reinforcing at the known notch points to withstand excessive strain and provide a stable two-post ROPS during load deformation.

Figure 2:
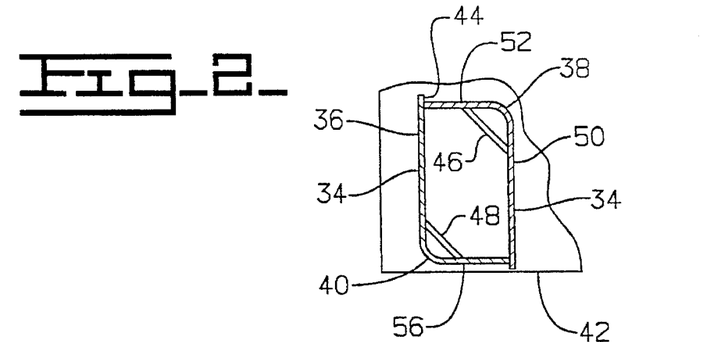
FIG. 2 is a cross-sectional view of a post of FIG. 1.

Referring now also to FIG. 2, posts 22 and 24 are constructed of two mating post members 34 and 36, each being generally L-shaped in cross-section. Each of members 34 and 36 define radiused corners 38 and 40 which, under load, tend to undergo greater amounts of strain than the square corners 42 and 44 defined at the attachment between the post members, respectively. To balance the differential strain between radiused corners 38 and 40 and square corners 42 and 44, reinforcing or stiffening members are attached along the post members at select lengths and across the radiused corners.

In FIG. 1, various stiffening members 46 and 48 are attached to respective post members 34 and 36 of posts 22 and 24 adjacent to cross member 30. Other stiffening members are attached to post members 34 and 36 adjacent to canopy 28 and base member 26. The various and other stiffening members are discussed hereinafter in greater detail.

Figure 3:
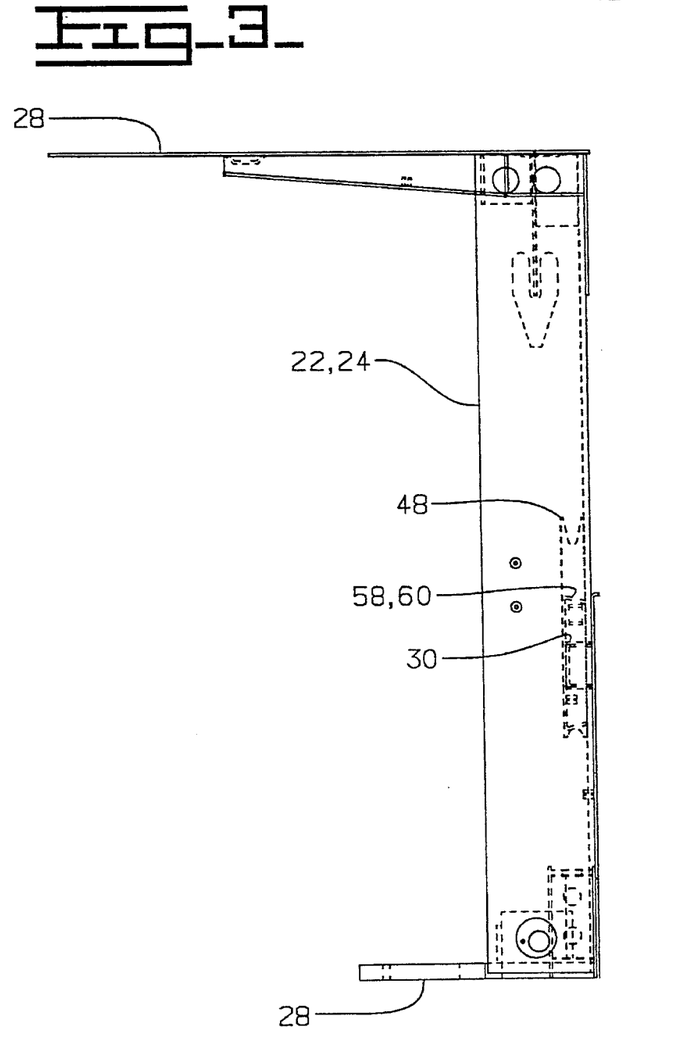
FIG. 3 is a side elevational view of the two-post ROPS of FIG. 1.
Figure 4:
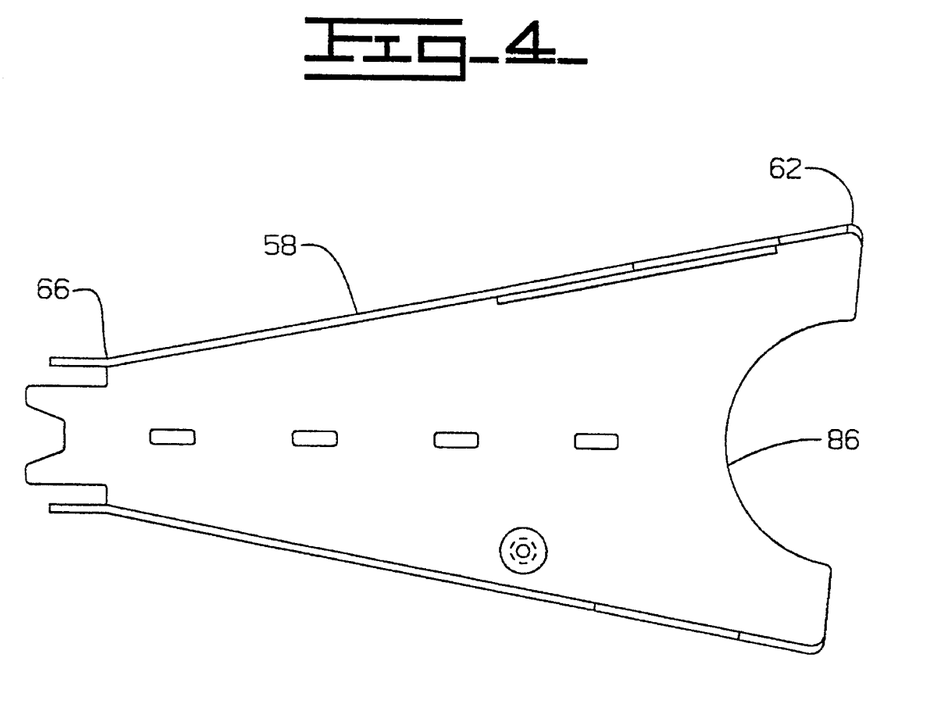
FIG. 4 is a bottom plan view of a gusset of FIG. 1.

Referring now to FIGS. 1–3, cross member 30 is constructed similarly to posts 22 and 24 in that it has a box-like cross-section. Each of post members 34 and 36 further define adjacent sides 50 and 52 and adjacent sides 54 and 56. Cross member 30 is attached to one of sides 50, 52, 54 or 56, depending on the particular orientation of the posts, and further adjacent to a stiffening member 48. Referring also to FIG. 4, reinforcing gussets 58 and 60 attach between cross member 30 and stiffening members 48 of posts 22 and 24. Gussets 58 and 60 are tapered between ends 62 and 64 and ends 66 and 68 thereof to provide a gradual transition between the small cross-section of cross member 30 and the larger cross-section of posts 22 and 24. In the specific preferred embodiment shown, ends 62 and 64 of gussets 58 and 60 are attached directly to stiffening members 48 of posts 22 and 24. Alternately, ends 62 and 64 could be attached directly to the angular members 34 and 36 of the posts adjacent to stiffening members 48.

Figure 5:
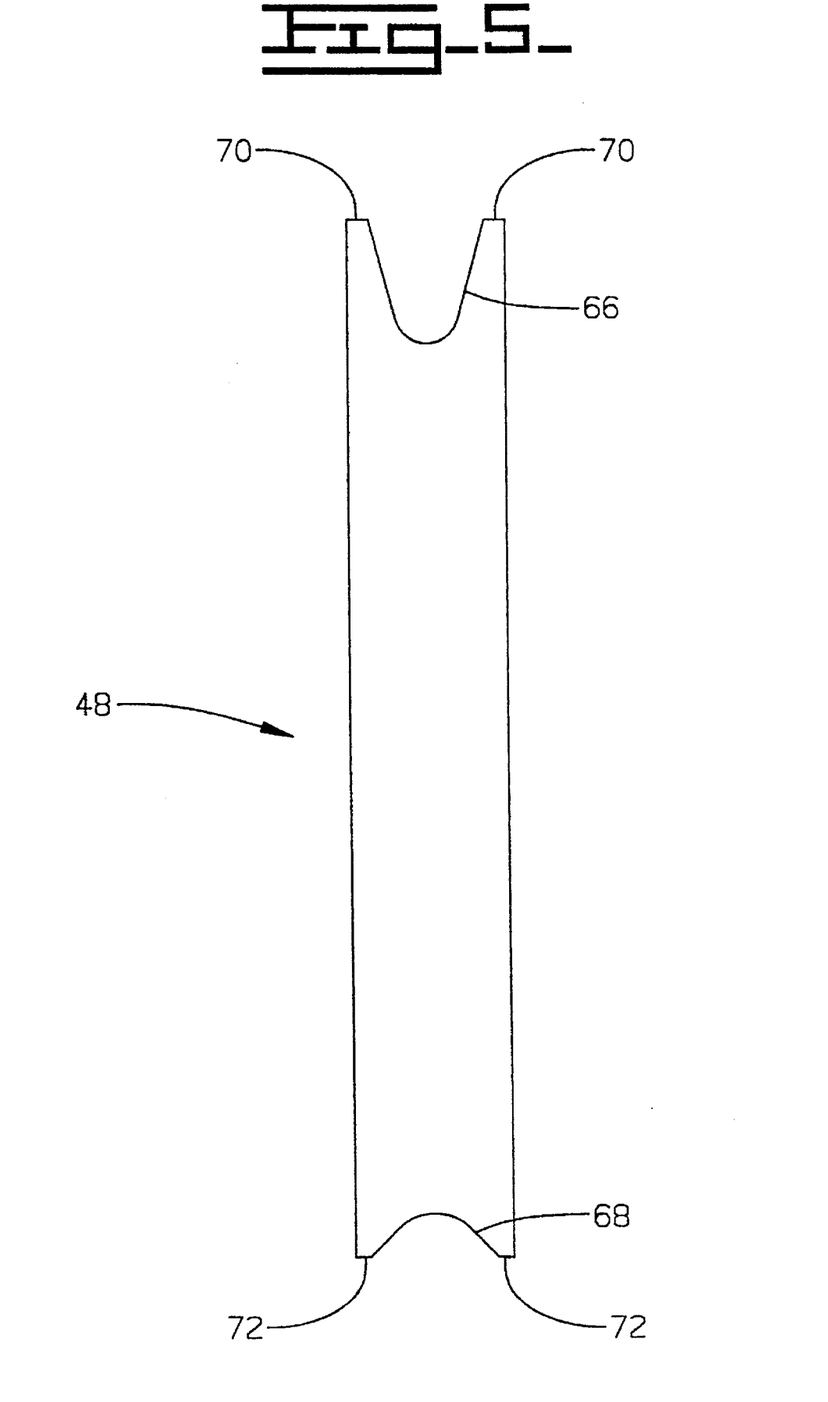
FIG. 5 is a top plan view of a first stiffening member of FIG. 1.

Referring now also to FIG. 5, stiffening member 48 is shown in greater detail. Stiffening member 48 is constructed of steel plate generally rectangular in shape so as to define a length and a width. Member 48 is welded to sides 54 and 56 of post member 36 along its sides such that its width traverses corner 40. As such, corner 40 is reinforced to a stiffness similar to that of square corner 42 or 44. Because member 48 is welded in place, arcuate cutouts 66 and 68 are provided at the ends of member 48. Preferably, cutouts 66 and 68 are elliptical in shape and transition to symmetric ends 70 and 72 having a reduced cross-section. As a result, any strain concentration at the ends of the weld is minimized.

Figure 6:
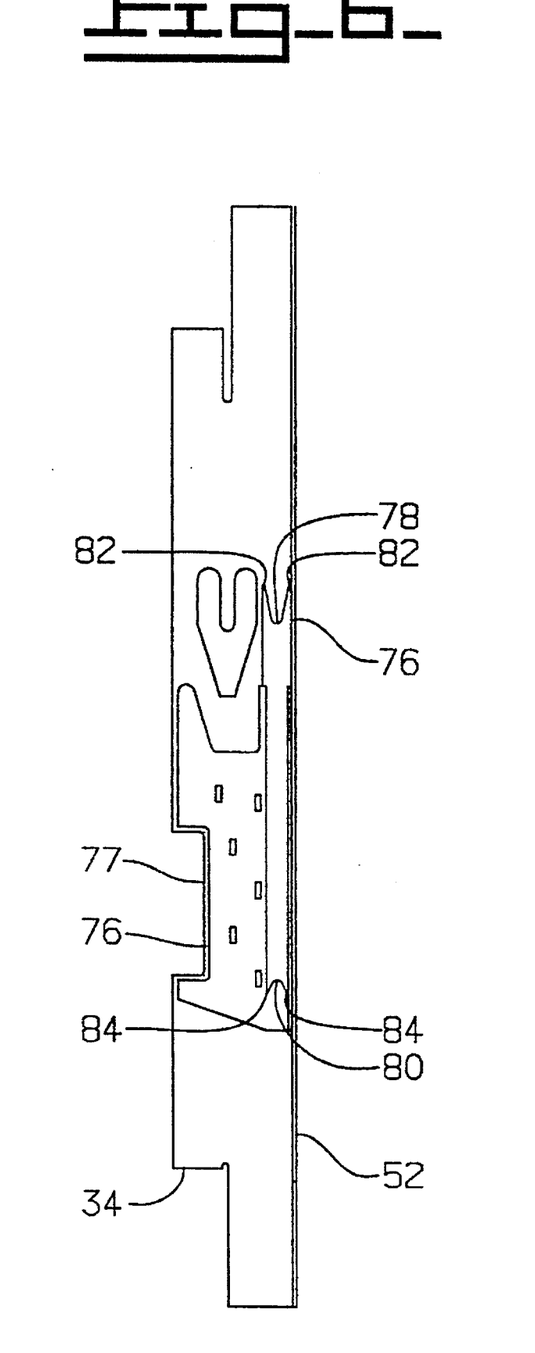
FIG. 6 is a top plan view of a second stiffening member of FIG. 1.

In FIG. 6, stiffening member 46 is shown in greater detail. Stiffening member 46 is similarly constructed of steel plate generally rectangular in shape so as to define a length and a width. Unlike stiffening member 48 which is attached directly to the sides of the post member, member 46 is attached along a portion of its length 74 to a reinforcing plate 76 which is first attached to post member 34. Reinforcing plate 76 provides added support for a cutout 77 which is shaped for receipt and welded attachment of cross member 30 therethrough. The remaining portion 76 of member 46 is attached directly to sides 50 and 52 of post member 34. Similar to stiffening member 48, member 46 is welded along its sides such that its width traverses corner 38. As such, corner 38 is reinforced to a stiffness similar to that of square corners 42 or 44.

Like stiffening member 48, member 46 includes arcuate cutouts 78 and 80 at its welded ends that transition to symmetric ends 82 and 84 having a reduced cross-section to minimize strain concentration at the ends of the weld. Similarly, in FIG. 4 each of gussets 58 and 60 are welded in place and include arcuate cutouts 86 and 88.

In addition to minimizing excessive deformation at known notch points, ROPS 20 provides stable deformation by maintaining resistance to additional load deformation as the structure is deformed. Because ROPS 20 includes only two main upright supports, the number of load paths is minimized during deformation. As such, it is critical for ROPS 20 to maintain in both load paths (i.e., along posts 22 and 24) resistance to additional load deformation as the structure is deformed to prevent collapse of the structure. As used herein, collapse of the ROPS occurs when the load resistance of the structure decreases as the structure continues to deform.

Figure 7:
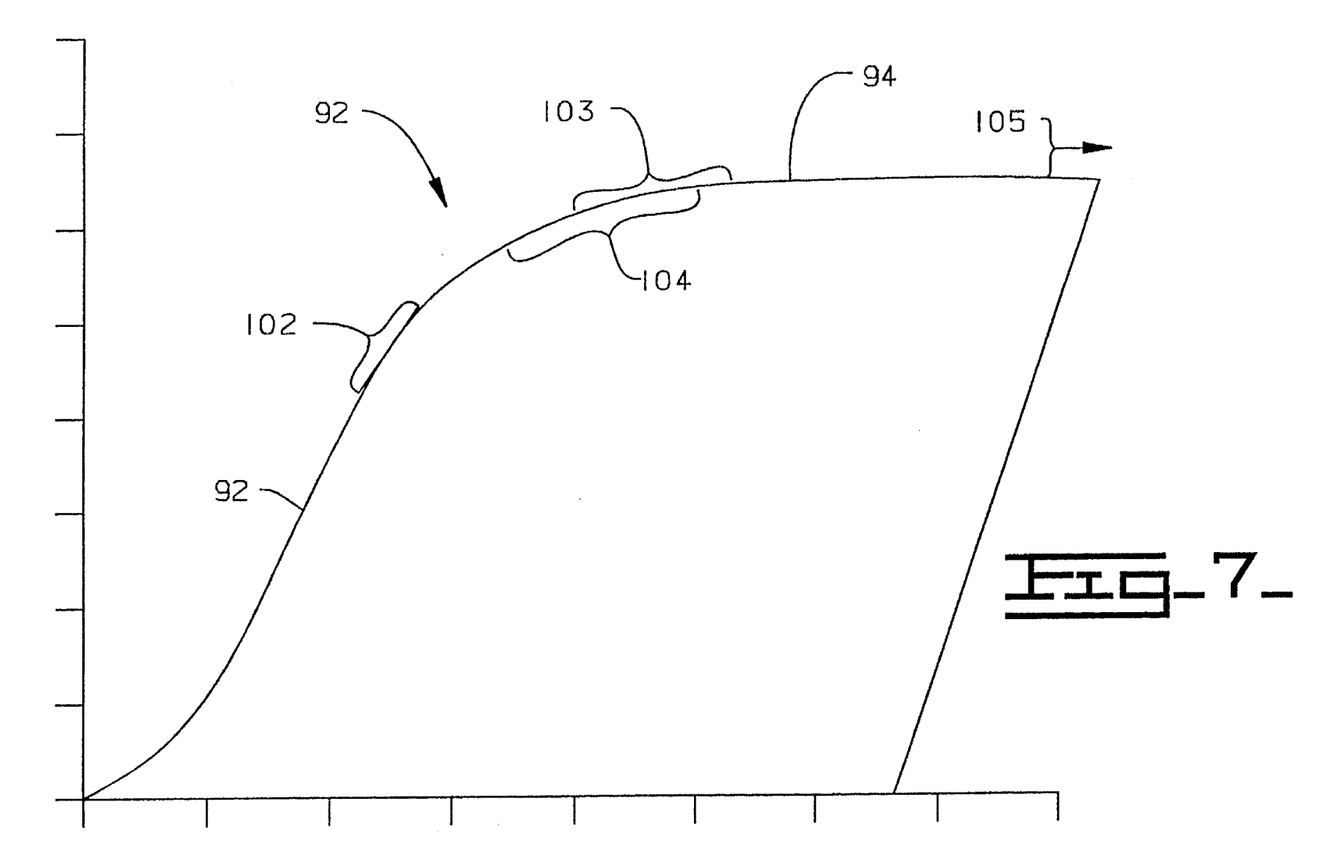
FIG. 7 is a graph of applied load v. deflection for the two-post ROPS of FIG. 1.

Referring now to FIG. 7, a load or force v. deflection curve 90 is shown for ROPS 20. Curve 90 includes a generally elastic portion 92 and a plastic portion 94. Elastic portion 92 shows an increasing resistance to deformation as ROPS 20 deflects. Plastic portion 94 shows a relatively level or constant resistance to deformation as ROPS 20 further deflects. The range of plastic deformation through which ROPS 20 is able to maintain resistance (i.e., generally portion 94) is alternately known as the collapse cushion. ROPS 20 provides a significant collapse cushion by sequentially shifting the point of deformation through continued loading and deformation.

Figure 8:
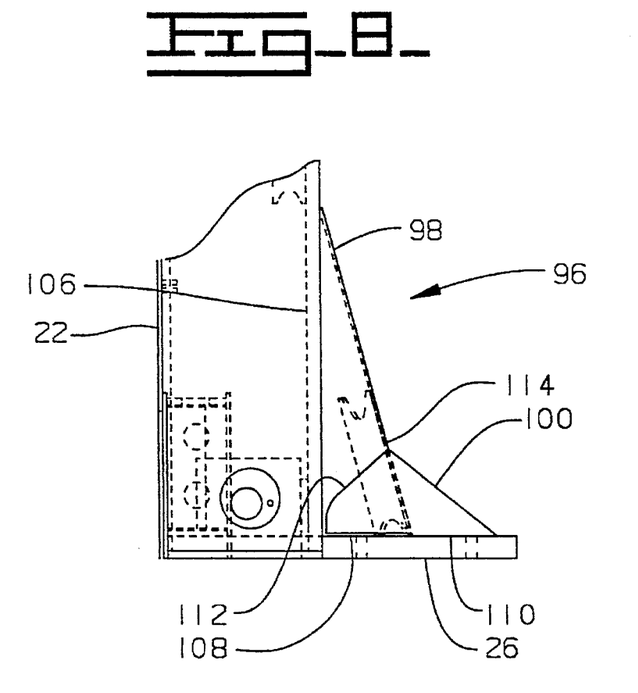
FIG. 8 is a side elevational view of the attachment of the post and base of the two-post ROPS of FIG. 1.

Referring now to FIG. 8, the attachment of the upright posts to the base is shown in greater detail. In FIG. 8, post 22 is shown attached to base plate 26 and is illustrative as well of the attachment of post 24 to the base. A reinforcing member 96 includes an upper portion 98 attached between post 24 and base plate 26 and a lower portion 100 attached between upper portion 98 and base plate 26. Upper portion 98 and lower portion 100 are constructed to collapse sequentially to maintain resistance to load deformation. In FIG. 7, lower portion 100 begins to plastically deform as indicated generally at 102, and collapses at approximately 103. Upper portion 98 begins to plastically deform at or about the collapse of lower portion 100 as indicated generally at 104, and collapses approximately at or beyond 105. It should be noted that a third sequence is the collapse of the post itself (not shown), which occurs after lower portion 100 and upper portion 98 collapse.

Upper portion 98 and lower portion 100 are generally U-shaped in cross-section and together with the attached post and base define a box-like structure that provides added strength with minimal structure. Upper portion 98 is triangular in shape and includes a long edge 106 attached to post 22 and a short edge 108 attached to base plate 26. Lower portion 100 is similarly triangular in shape, but only between upper portion 98 and base plate 26. Lower portion 100 includes a long edge 110 attached to baseplate 26 and an arcuate edge 112 attached about the exposed U-shaped surface of upper portion 98.

Figure 9:
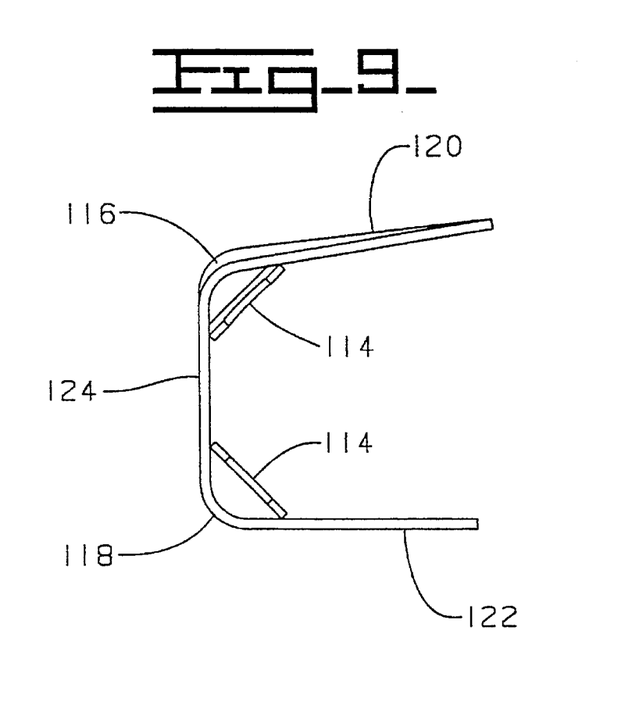
FIG. 9 is a cross-sectional view of a reinforcing member of the attachment of FIG. 8.

Upper portion 98 is internally reinforced by reinforcing or stiffening members 114. Referring now also to FIG. 9, the generally U-shaped cross-section of upper portion 98 defines interior corners 116 and 118. Stiffening members 114 are similar to members 48 in construction. Members 114 are constructed of steel plate generally rectangular in shape so as to define a length and a width. Members 114 are welded between the sides 120 and 122 and end 124 of upper portion 98 along their respective lengths such that their widths traverse corners 116 and 118. As such, upper portion 98 is reinforced to a stiffness greater than that of lower portion 100 so that it deforms at higher loads.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For example, other embodiments than the specific preferred embodiment shown herein might come within the spirit of the invention if they combine corner stiffeners with a ROPS frame or if they provide sequential deformation of a ROPS frame at the frame to base attachment.

What is claimed is:

1. A rollover protective structure for use with construction machinery, comprising:

a base member;

a first post attached to and extending upwardly from said base member, said first post including a first angled post member defining a first interior corner between adjacent first sides thereof;

a second post attached to and extending upwardly from said base member, said second post including a second angled post member defining a second interior corner between adjacent second sides thereof;

a cross member extending between said first angled post member and said second angled post member above said base member;

a first reinforcing member attached between said first sides across said first interior corner and adjacent to said cross member;

a second reinforcing member attached between said second sides across said second interior corner and adjacent to said cross member;

a third reinforcing member attached between said cross member and said first angled post member adjacent to said first reinforcing member; and a fourth reinforcing member attached between said cross member and said second angled post member adjacent to said second reinforcing member.

2. The rollover protective structure of claim 1, and further comprising:

a fifth reinforcing member attached between said base member and said first post adjacent to the intersection thereof; and a sixth reinforcing member attached between said base member and said second post adjacent to the intersection thereof;

said fifth reinforcing member and said sixth reinforcing member being constructed to collapse sequentially and maintain resistance to additional load deformation as the rollover protective structure is deformed.

3. The rollover protective structure of claim 1, wherein:

said first post and said second post are box-like in cross-section to define said first interior corner and said first sides and said second interior corner and said second sides respectively; and said first reinforcing member and said second reinforcing member are each plate-like in construction and have a length and width, said first reinforcing member and said second reinforcing member being attached lengthwise between said first sides and said second sides and widthwise across said first corner and said second corner respectively.

4. The rollover protective structure of claim 3, wherein:

said first reinforcing member and said second reinforcing member are each welded lengthwise between said first sides and said second sides respectively; and said first reinforcing member and said second reinforcing member each include arcuate cutouts extending widthwise across said first corner and said second corner respectively.

5. The rollover protective structure of claim 4, wherein said third reinforcing member and said fourth reinforcing member are each gusset-like in construction and have a first end which tapers in width down to a second end, said first end of said third reinforcing member and said fourth reinforcing member being attached along the length of said first reinforcing member and said second reinforcing member respectively and said second end of said third reinforcing member and said fourth reinforcing member being attached to said cross member respectively.

6. A rollover protective structure for use with construction machinery, comprising:

a frame including first and second upright posts and a base member;

each of said first and second upright posts being constructed of a first angled post member defining a first interior corner between adjacent first sides thereof and a second angled post member defining a second interior corner between adjacent second sides thereof, said first sides being attached to said second sides to define a box-like cross-section for each of said first and second posts;

a first reinforcing member attached between said first sides across said first interior corner; and a second reinforcing member attached between said second sides across said second interior corner.

7. The rollover protective structure of claim 6, and further comprising a third reinforcing member attached between said base member and one of said first and second upright posts adjacent to the intersection thereof, said third reinforcing member including an upper portion attached between said one upright post and said base member and a lower portion attached between said upper portion and said base member, said upper portion and said lower portion being constructed to collapse sequentially to maintain resistance to additional load deformation as the rollover protective structure is deformed.

8. The rollover protective structure of claim 6, wherein said first reinforcing member and said second reinforcing member are each plate-like in construction and have a length and width, said first reinforcing member and said second reinforcing member being attached lengthwise between said first sides and said second sides and widthwise across said first corner and said second corner respectively.

9. The rollover protective structure of claim 8, wherein:

said first reinforcing member and said second reinforcing member are each welded lengthwise to said first sides and said second sides respectively; and said first reinforcing member and said second reinforcing member each include arcuate cutouts extending widthwise across said first corner and said second corner respectively.

10. A method for reinforcing a rollover protective structure including a frame having a support member, the method comprising the steps of:

obtaining a first angled post member defining a first interior corner between adjacent first sides thereof and a second angled post member defining a second interior corner between adjacent second sides thereof;

attaching a first reinforcing member between said first sides across said first interior corner; attaching a second reinforcing member between said second sides across said second interior corner; and attaching said first sides to said second sides to define said support member.

* * * * *